United States Patent

[11] 3,590,491

| [72] | Inventor | Russell W. Anthony |
| | | Harper Woods, Mich. |
| [21] | Appl. No. | 806,058 |
| [22] | Filed | Mar. 11, 1969 |
| [45] | Patented | July 6, 1971 |
| [73] | Assignee | Lear Siegler, Inc. |
| | | Santa Monica, Calif. |

[54] GAUGE FOR MEASURING GEAR TOOTH TAPER
9 Claims, 5 Drawing Figs.

[52] U.S. Cl. .................................................. 33/179.5
[51] Int. Cl. .................................................. G01b 5/24
[50] Field of Search .................................... 33/179.52, 179.53

[56] References Cited
UNITED STATES PATENTS
2,563,910 8/1951 Bean ........................... 33/179.5 (2)
2,803,342 8/1957 Gates ........................... 33/179.5 (2) X
2,821,024 1/1958 Nyland ........................ 33/179.5 (2)
3,280,467 10/1966 Motz ............................ 33/179.5 (2)

*Primary Examiner* — Leonard Forman
*Assistant Examiner* — Dennis A. Dearing
*Attorney* — Whittemore, Hulbert and Belknap ABSTRACT: A gauge having master gears rotated in mesh with a work gear and in pressure contact respectively with opposite sides of the teeth of the work gear as the result of differential drives for the master gears, the master gears being each mounted for swivel movement about an axis perpendicular to and intersecting its own axis and the axis of the gear. Indicators are provided for measuring swivel movement of the master gears, thus measuring lead at opposite sides of the teeth or in effect, the tooth paper.

PATENTED JUL 6 1971

INVENTOR.
RUSSELL W. ANTHONY
BY Whittemore,
Hulbert + Belknap
ATTORNEYS

INVENTOR.
RUSSELL W. ANTHONY
BY Whittemore,
Hulbert & Belknap
ATTORNEYS

GAUGE FOR MEASURING GEAR TOOTH TAPER

SUMMARY OF THE INVENTION

It is desirable in some cases to determine the end-to-end taper of the teeth of a work gear and preferably, in such a way as to determine the taper of all of the teeth. This can of course be accomplished by measuring the lead at opposite sides of the teeth. If the teeth exhibit identical lead at both sides then it follows that the teeth have no taper.

In accordance with the present invention a work gear is rotated in mesh with two master gears the teeth of which are maintained in pressure contact with opposite sides of the teeth of the work gear. Each of the master gears is made to have a swivel movement about an axis which is perpendicular to and intersects its own axis and the axis of the work gear.

Suitable gauge means are provided for sensing, and if desired, measuring and recording swivel movement of the master gears, thus affording a direct measurement of the lead of each of the teeth of the master gears, and by comparing the lead at opposite sides of individual teeth, affording means of determining tooth taper.

DETAILED DESCRIPTION

Figure 1:
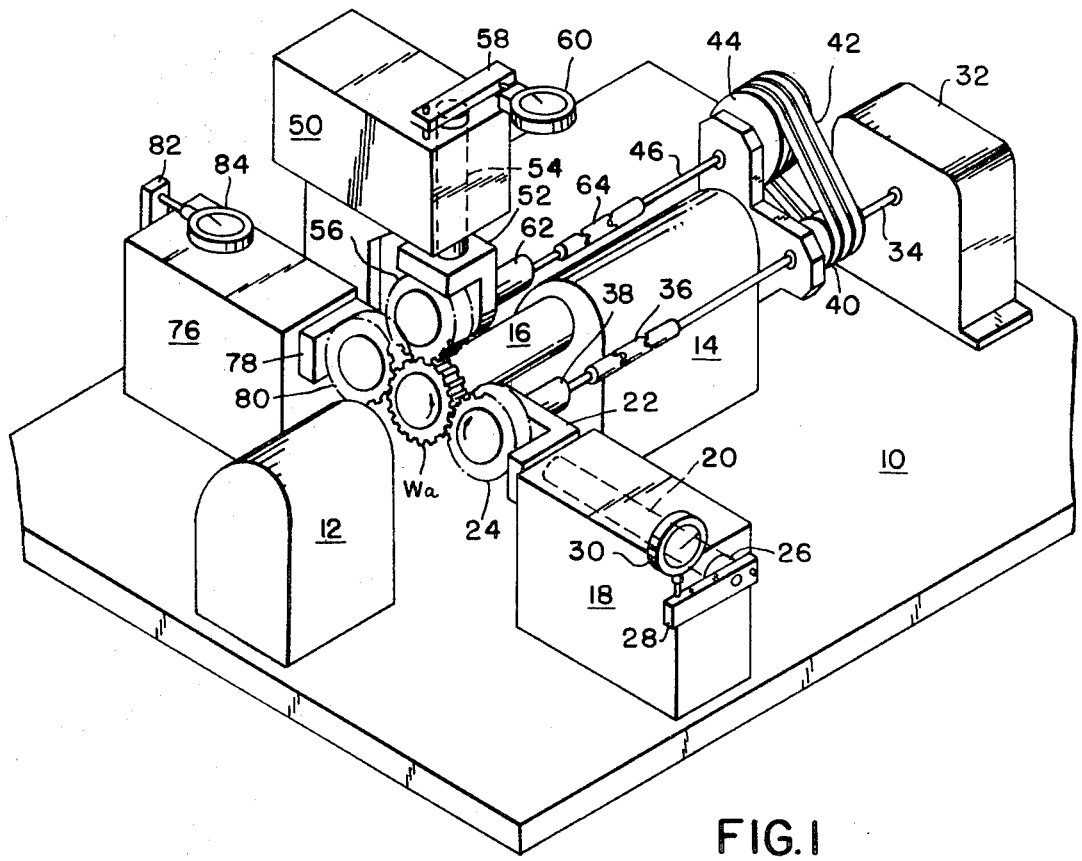
FIG. 1 is a perspective view of a gauge for measuring gear tooth taper.

Referring first to FIG. 1 the gauge comprises a base 10 which carries a headstock 12 and a tailstock 14 for supporting a work gear Wa. The work gear Wa is illustrated as mounted on an arbor 16 extending from the tailstock 14. In practice, a second arbor (not shown) preferably extends from the headstock 12 into the central opening in the work gear and may interfit with the arbor 16.

Mounted on the base 10 is an upstanding support 18 having a bearing therein which receives a shaft 20 carrying a bracket 22 on which a master gear 24 is journaled. The axis of the shaft 20 is perpendicular to and intersects the axes of both the master gear 24 and the work gear Wa. The shaft 20 extends through the support 18 as indicated at 26, and carries an arm 28 which is associated with an indicator 30 to sense the angular position of the master gear 24. It will be understood that as the master gear 24 is caused to swivel about the axis of its support shaft 20, such movement is transmitted to the indicator 30. It will further be understood that the indicator 30 as illustrated herein, is of course merely diagrammatic and that any suitable sensing and/or measuring device may be employed and if desired, may be associated with conventional recording equipment.

Carried by the base 10 is a motor 32 having a drive shaft 34 which is coupled through a universal driving connection 36 to a shaft 38 which carries the master gear 24. Fixed on the drive shaft 34 is a pulley construction 40 which is connected through belting 42 to a pulley construction 44 mounted on a drive shaft 46.

A second support, indicated generally at 50, is provided on the base 10 and includes a swivel bracket 52 which may be identical with the bracket 22 and which includes a shaft 54 which provides a swivel mounting for a second master gear 56. The shaft 54 carries an arm 58 which cooperates with an indicator 60 which in turn may be identical with the indicator 30 previously described.

The master gear 56 is carried by a shaft 62 which is coupled to the shaft 46 by a universal driving connection 64.

It will be observed that the pulley 40 is smaller than the pulley 44 and in consequence the shaft 46 tends to be driven at a slower speed than the driving shaft 34. However, it may be assumed that the work gear Wa is being positively driven by the master gear 24 and that hence, the master gear 56, which is illustrated here as of the same diameter as the master gear 24, is required to rotate at the same speed as the master gear 24. Accordingly, the pulleys 40 and 44 and the belting 42 in effect constitute a brake which causes the teeth of the master gear 56 to remain in pressure contact with the sides of the gear teeth opposite to the sides engaged by the teeth of the master gear 24.

Preferably, the belting 42 comprises a plurality of O-rings of circular cross section and the pulleys or sheaves 40, 44 are provided with belt receiving grooves the bottoms of which are of semicircular cross section. With this construction the enforced slippage of the belting or O-rings relative to one or both of the pulleys constitutes a smooth acting braking device effective to maintain the teeth of the master gears in pressure engagement with the teeth of the work gear Wa.

While this particular form of braking device has been found to operate exceptionally satisfactorily, other friction brakes or drag devices may of course be employed.

In order that each of the master gears shall be positioned solely by its engagement with one side of the teeth of the work gear Wa, the master gears are dimensioned and mounted such that they are in loose mesh with the work gear. This relationship is best illustrated in FIG. 2 where it will be observed that the teeth 66 of the work gear and the teeth 68 of a master gear are in contact at one side only as indicated at 70, and that at the opposite side clearance exists as indicated at 72.

Figure 2:
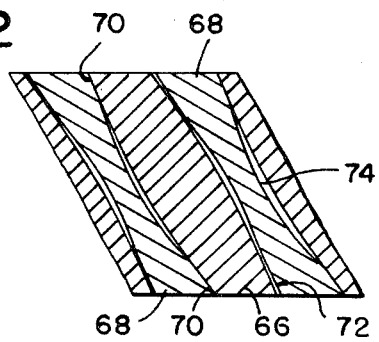
FIG. 2 is an enlarged sectional view through a few engaged teeth of the work gear and one of the master gears.

FIG. 2 also represents a modification of master gears which enables them to be used with a work gear having crowned teeth. It will be observed that the teeth 66 of the work gear crowned, or of a greater thickness centrally than adjacent the ends thereof. It will be appreciated that if unmodified or straight teeth were provided on the master gears, tooth contact would be limited to a small area generally adjacent the midportions of the teeth with the result that no adequate forces would be developed to cause the teeth of the master gears to extend in the same direction as the teeth of the work gear. Accordingly, the teeth 68 of the master gears are longitudinally concave as indicated at 74 so that contact between the concave teeth 74 of the master gear and the crowned teeth 66 of the work gear is limited to the areas 70 adjacent the ends of the teeth.

In FIG. 1 there is illustrated a gauge having a third support 76 carrying a bracket 78 mounting a third master gear 80 which in this instance is in tight mesh with the teeth of the work gear Wa. Suitable resilient means are provided urging the bracket 78 radially toward the work gear Wa and the bracket includes a shaft connected to an abutment 82 engageable with a plunger on an indicator 84. This affords an indication of size and/or eccentricity of the work gear Wa and may be arranged to be responsive to nicks or burrs thereon.

Figure 4:
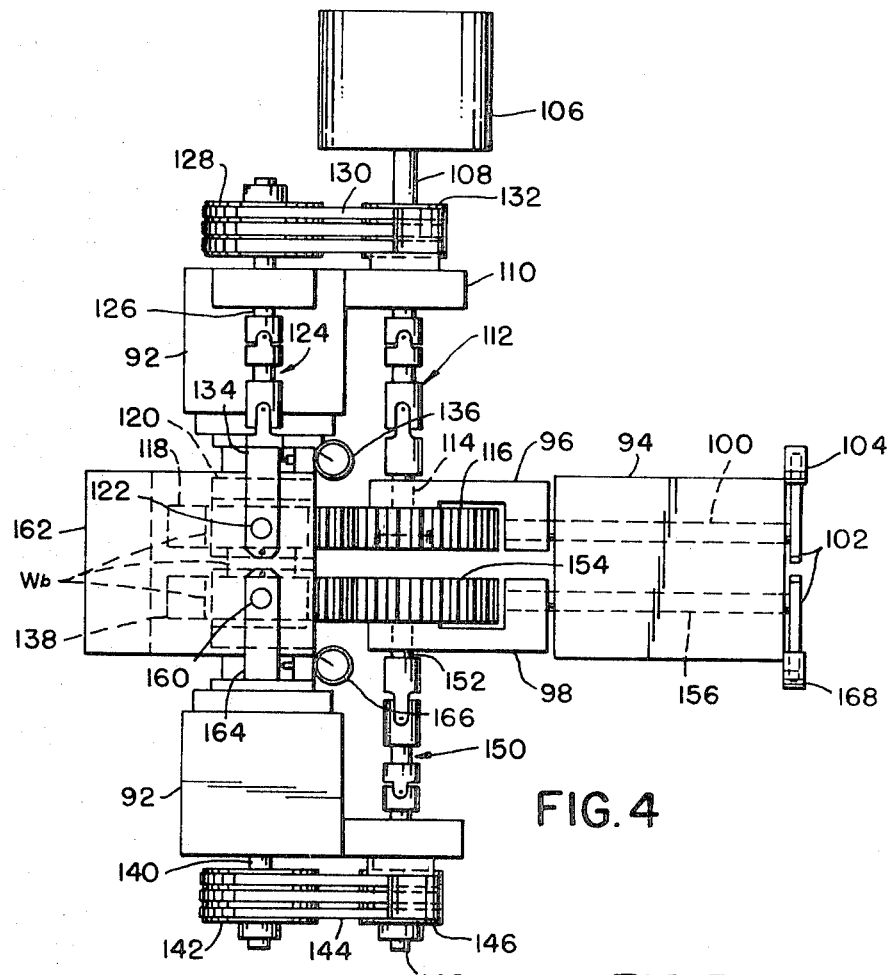
FIG. 4 is a plan view of the gauge shown in FIG. 3.
Figure 3:
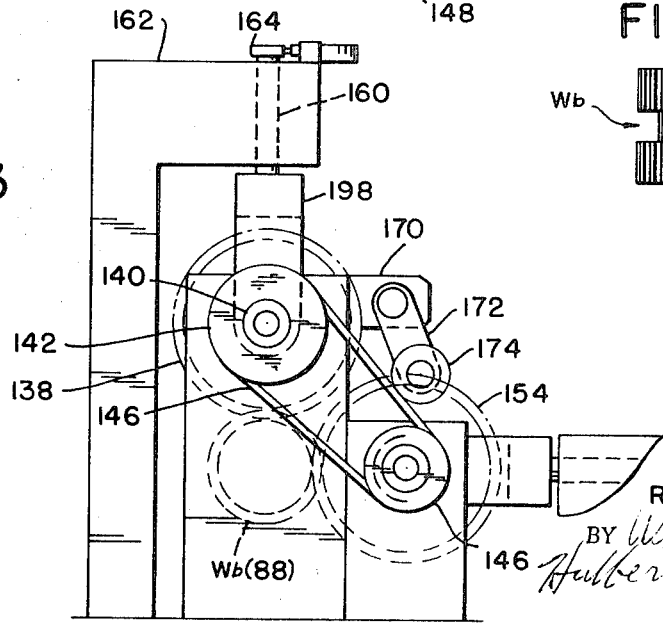
FIG. 3 is an elevational view of a modified gauge adapted to measure taper of two gears of a double gear simultaneously.
Figure 5:
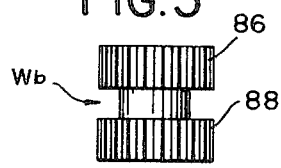
FIG. 5 is an elevational view of the double gear on which the gauge of FIGS. 3 and 4 is employed.

Referring now to FIGS. 3—5 there is illustrated a somewhat more complex gauge which is intended for effecting simultaneous measurement of taper of two gear portions 86 and 88 of a double gear indicated generally at Wb. In this arrangement a work gear Wb is journaled between head and tailstocks 92 for free rotation on a supporting shaft or arbor. A support 94 is provided carrying two brackets 96 and 98, and each bracket 96 is supported on a swivel shaft, one of which is shown at 100 connected to an actuating arm 102 associated with indicator 104 which may be identical with the indicator 30 of FIG. 1. A motor 106 is provided having a shaft 108 extending through a support 110 and connected by a universal driving coupling 112 to a shaft 114 connected to the master gear 116. A second master gear 118 is similarly mounted on a bracket 120 for swiveling movement about the vertical axis of a mounting shaft 122. The shaft carrying the master gear 118 is connected through a universal driving coupling 124 to a shaft 126 carrying sheaves 128 connected by belting 130 to sheaves 132 driven by the motor output shaft 108.

As in the embodiment of the invention illustrated in FIG. 4, the size of the sheaves or pulleys 128, 132 is related so that the master gear 118 constitutes a drag or brake and is driven by the work gear W*b*. The shaft 122 carries an arm 134 which is associated with a dial indicator 136.

The construction as so far described is substantially identical with that disclosed in FIG. 1. According to this embodiment of the invention however, a second master gear 138 is provided carried by a shaft 140 which carries sheaves or pulleys 142 coupled through belting 144 to smaller sheaves or pulleys 146. These in turn are connected to a shaft 148 which is connected through a universal drive coupling 150 with a shaft 152 carrying a further master gear 154. The shaft 152 carrying the master gear 154 is journaled in the bracket 98, which in turn is mounted for swiveling movement about the axis of shaft 156.

The shaft 140 is carried by a bracket 198 having a shaft 160 extending through an overhanging support 162 and provided with an arm 164 adapted to actuate a dial indicator 166. The arm 102 connected to the shaft 156 of the bracket 98 is adapted to actuate a dial indicator 168.

Means are preferably provided with the belting for effecting belt tension and this means comprises a bracket 170 carrying an adjustable arm 172 provided with roller means 174 engageable with the belting intermediate the pulleys 142, 144 as seen in FIG. 3. However, it is to be understood that such belt tension adjustment means may be provided with any of the belting illustrated in the several FIGURES. It is also to be understood that in the embodiment of the invention illustrated in FIGS. 3—5 it is preferable to employ O-ring type belting of circular cross section in association with correspondingly shaped pulleys or sheaves.

With this arrangement the master gear 116 directly drives the gear part 86 of the double work gear W*b*, which in turn drives the master gear 118 against the resistance afforded by the pulley and belting structure 128, 130, 132. This insures that the master gears 116 and 118, which are in loose mesh with the gear part 86, contact opposite sides of the teeth thereof so that the dial indicators 104 and 136 provide an indication and/or measurement of the taper of the teeth of the gear part 86. Rotation of the gear part 86 is of course imparted to the entire double gear W*b* so that the gear part 88 is driven at the same speed. The gear part 88 is in mesh with the master gear 138 and drives it at a speed determined by the number of teeth of the gear part 88 and of the master gear 138. The master gear 154, which as illustrated in FIG. 3 is of the same size as the master gear 138, is also in mesh with the gear part 88 and accordingly is required to be driven thereby at the same speed as the master gear 138. However, the master gear 138 imparts rotational movement to the pulley 142 connected by the belting 144 to the somewhat smaller pulley 144 which in turn is connected for rotation with the master gear 154. Thus, the master gears 138 and 154, which are in loose mesh with the gear part 88 of the work gear W*b*, have their teeth maintained in engagement with opposite sides of the teeth of the work gear. Accordingly, as the motor 106 drives all of the rotatable parts, the indicators 166 and 168 afford an indication of the angular positions of the master gears 138 and 154 and hence, of the taper of the teeth of the gear part 88.

The use of the friction belting and pulley mechanism may be described in broad terms as involving differential pulley and belting mechanism interconnecting the master gears for rotation at relative speeds different from the relative speeds required by their meshed engagement with the same work gear. Since the belting is friction belting, slippage occurs which has the effect of maintaining the teeth of the master gears in firm contact with opposite sides of the teeth of the work gear.

What I claim as my invention is:

1. A gear checker for determining tooth taper comprising means for mounting a work gear for rotation in a precisely predetermined position, first and second master gears, means for mounting said master gears for rotation in a loose mesh engagement with the work gear at circumferentially spaced locations relative thereto, means for rotating said work gear and master gears in said loose mesh engagement with the master gears said engagement allowing only one side of a tooth of said first master gear to engage only one side of a first tooth of said work gear and only one side of a tooth of said second master gear to engage only one side of a second tooth of said work gear said first work gear tooth being circumferentially spaced from said second work gear tooth, said tooth side engaged by said first master gear being opposite to said second tooth side, the master gear mounting means comprising means providing for angular movement of each of said master gears about an axis normal to and intersecting its axis and intersecting the axis of rotation of the work gear, and means for sensing the angular position of both of said master gears.

2. A gear checker as defined in claim 1 in which the means for rotating said work and master gears comprises means for driving one of said master gears in rotation to thereby drive the work gear, and means for opposing rotation of the other of said master gears by the work gear.

3. A gear checker as defined in claim 2 in which the means for opposing rotation of said second master gear comprises a drive pulley connected to rotate with said first master gear, a driven pulley connected to rotate with said second master gear, friction belting connecting said pulleys, said pulleys being dimensioned such that said driven pulley tends to rotate said second master gear at a rate slightly slower than it is rotated by meshed engagement with the work gear.

4. A gear checker as defined in claim 3 in which said belting comprises O-rings of circular cross section.

5. A gear checker as defined in claim 4 in which said pulleys have grooves of generally semicircular cross section.

6. A gear checker as defined in claim 1 in which said master gears have teeth which are longitudinally concave so as to limit contact between the teeth of said master gears and work gear to the end portions thereof.

7. A gear checker as defined in claim 1 in which the checker is for use with a double gear having integral axially spaced first and second gear portions, said first and second master gears being in mesh with said gear portions, comprising an additional pair of master gears mounted for rotation in loose mesh with said second gear portion and for swivel movement about axes perpendicular to and intersecting their own axes and the axis of the second gear portion, a single motor for rotating said double gear and the four master gears in said loose mesh engagement therewith, and means for sensing the angular position of both of the master gears of said additional pair.

8. A gear checker as defined in claim 7 comprising differential friction belting interconnecting the master gears of said additional pair to provide for pressure between the teeth of each master gear at opposite sides of the teeth of the second gear portion.

9. A gear checker as defined in claim 1, differential friction belting and pulley mechanism connecting said master gears for rotation at relative speeds different from the relative speeds required by their meshed engagement with the same work gear.